Jan. 22, 1963     A. A. FOSTER     3,074,410
TEMPERATURE CONTROL FOR THERAPEUTIC APPARATUS
Filed Jan. 23, 1961     3 Sheets-Sheet 1

INVENTOR.
ARTHUR A. FOSTER
BY Ely, Frye & Hamilton
ATTORNEY

Jan. 22, 1963     A. A. FOSTER     3,074,410
TEMPERATURE CONTROL FOR THERAPEUTIC APPARATUS
Filed Jan. 23, 1961     3 Sheets-Sheet 2

INVENTOR.
ARTHUR A. FOSTER
BY
ATTORNEY

Jan. 22, 1963  A. A. FOSTER  3,074,410
TEMPERATURE CONTROL FOR THERAPEUTIC APPARATUS
Filed Jan. 23, 1961  3 Sheets-Sheet 3
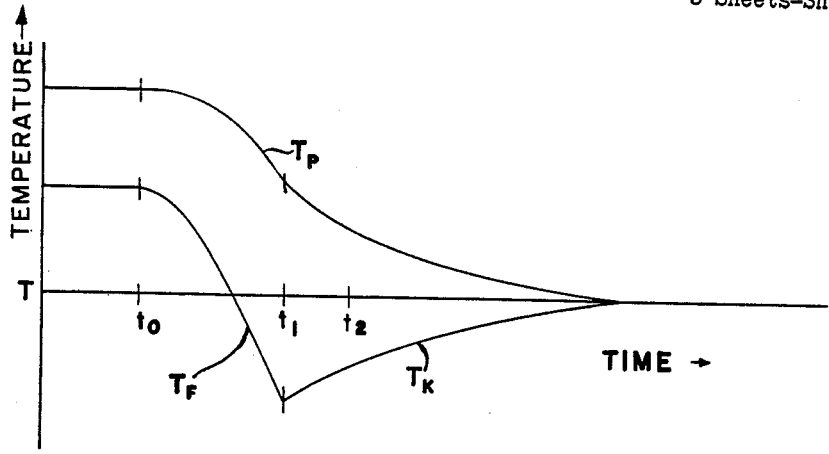
FIG. 3
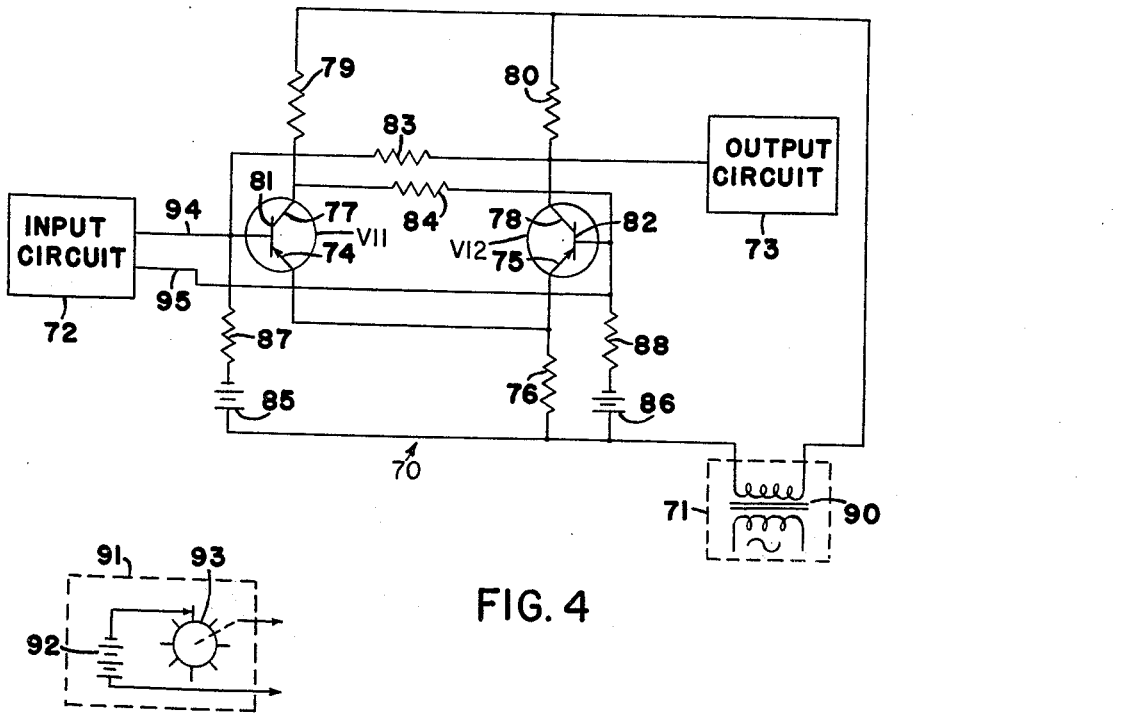
FIG. 4
FIG. 5
INVENTOR.
ARTHUR A. FOSTER
BY
ATTORNEY United States Patent Office 3,074,410
Patented Jan. 22, 1963

3,074,410
TEMPERATURE CONTROL FOR
THERAPEUTIC APPARATUS
Arthur A. Foster, Butler, Ohio, assignor to Gorman-Rupp Industries, Inc., Bellville, Ohio, a corporation of Ohio
Filed Jan. 23, 1961, Ser. No. 84,112
16 Claims. (Cl. 128—400)

This invention relates to temperature control and, more particularly to apparatus for controlling the temperature of the human body.

An object of this invention is to provide apparatus for maintaining the temperature of a patient at a predetermined and controllable level.

A more general object of the invention is to provide temperature control of heating and cooling apparatus for objects, spaces, and the like.

Another general object of the invention is to control fluid exchange media in heating and cooling systems.

Still another general object of the invention is to provide electrical and electronic apparatus for control of time-varying conditions in fluid heat exchange systems.

It is known that under certain conditions the temperature control system of the human body becomes inoperative and that the body temperature is liable to depart from normal in an uncontrolled way. Moreover, the direction of change is unpredictable and there is no means of determining in advance what provision must be made for control of body temperature in a patient so affected. Such system loss of temperature control may occur particularly in the case of shock resulting from accidents, as a result of certain diseases, or in very young children.

Under such circumstances it has heretofore been usual to provide heating and cooling facilities in which a liquid heat exchange medium was circulated in a pad arranged in contact with the body of the patient. Heat energy was supplied to or removed from the liquid accordingly as it was desired to heat or cool the patient.

The usefulness of such apparatus in compensating for the system variation of patient temperature was, however, limited by reason of the fact that the temperature of the pad liquid could not be varied in such a way as to accomodate the changes in patient temperature. More particularly, the means for detecting or measuring changes in patients' temperatures was slow and did not provide information as to the rate or direction of change of temperature in sufficient time to compensate for that change in a way such that the temperature of the patient could be brought to and maintained at the normal body temperature level.

The present invention contemplates the utilization of such liquid heating and cooling apparatus with an electrical temperature detection, measuring, and control means whereby the temperature of the patient's body may be maintained between predetermined and controllable limits. Specifically as disclosed and described herein, a first thermistor is utilized for measuring the temperature of the patient's body and a second thermistor is utilized for measuring the temperature of the liquid medium. The first thermistor functions as part of an electrical control system including a bridge, an amplifier, a bistable circuit and control apparatus for operating a heater and a cooler to heat or cool the liquid medium according to the condition of the patient.

A second bistable circuit and control apparatus is responsive to the second thermistor and determines the operation of the heater and cooler such that the amount of heat supplied to or removed from the liquid medium is determined by the difference between the temperature of the patient's body and the desired temperature level.

The invention together with further objects, features, and advantages thereof will be understood by reference to the following detailed specification, claims, and drawing, which illustrate one or more embodiments of the invention.

In the drawing:

FIG. 3 illustrates the operation of the circuits and apparatus of the invention;

FIG. 4 is a schematic diagram of the bistable circuit of the invention; and

FIG. 5 is a partial showing of an alternate embodiment of the circuit of FIG. 4.

Figure 1:
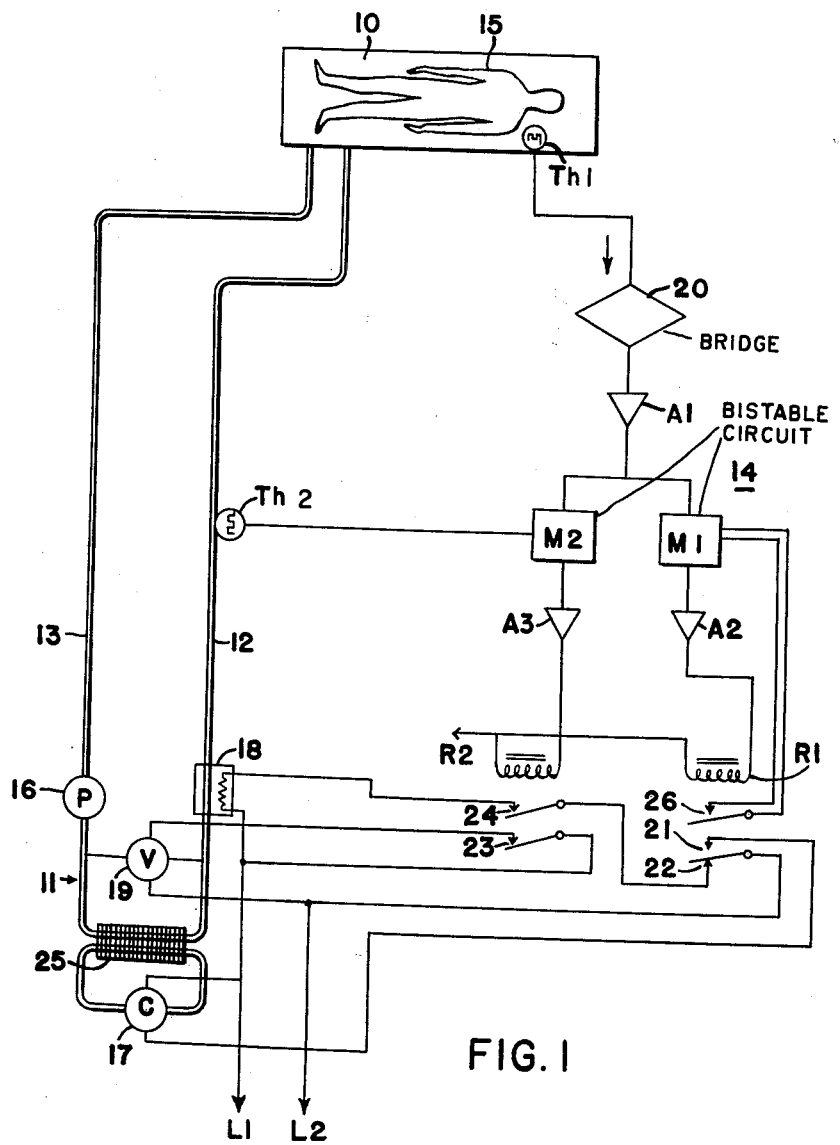
FIG. 1 is a simplified representation, partly schematic and partly diagrammatic of the apparatus of the invention.

Referring now to FIG. 1, the apparatus of the invention comprises a thermal pad 10, a supply apparatus 11, outlet and return leads 12 and 13 connecting the supply apparatus and the pad, and an electrical control apparatus 14 for operating the supply apparatus to maintain a patient 15 at a predetermined temperature, also referred to herein as the normal temperature, or within a predetemined temperature range about the normal temperature.

The thermal pad 10 may be constituted as a blanket or a sheet having a core with conduits for circulating a liquid heat exchange medium, such as water, for transmitting or receiving thermal energy to or from the patient 15. The supply apparatus 11 includes a pump 16 for circulating the liquid medium, a cooler comprising a refrigerating device of which a compressor 17 is shown, an electrical heater 18, and a by-pass valve 19. The pump runs continuously and the valve 19 shunts the liquid medium around the refrigerating device when cooling of the liquid medium is not required, so that the compressor may run continuously during the cooling phase of the operation of the apparatus.

In operation the electrical control apparatus is controlled by two thermistors which sense the body temperature of the patient and the temperature of the liquid medium respectively. The first thermistor, indicated at $Th1$ and referred to as the body temperature thermistor, is attached to, or inserted in, the body of the patient at a place such that a representative measure of body temperature is obtained. The body temperature thermistor is connected in one arm of a direct current resistance bridge 20 which is adjusted or calibrated so that the bridge is balanced at the predetermined or normal temperature of the patient. Accordingly, the voltage at the output terminals of the bridge is proportional in magnitude to the difference between the temperature of the patient's body, e.g. actual temperature, and the normal temperature, and has a direct current phase determined by the relation of the actual temperature to the normal temperature, e.g. above or below that temperature.

The second thermistor, indicated at $Th2$ and referred to as the pad temperature thermistor, is arranged in heat transfer contact with the liquid medium at the outlet of the supply apparatus 11, e.g. at the lead 12. Accordingly the resistance of the thermistor $Th2$ is a function of the temperature of the liquid medium and varies with that temperature. In the apparatus herein described, the leads 12 and 13 are small, and the thermal mass and velocity of the liquid medium are large in respect to the thermal mass of the pad and patient, so that the thermistor $Th2$ provides a representative measure of the temperature of the pad.

A direct current amplifier A1 is connected to the output of the bridge 20 and has its output connected to two bistable circuits M1 and M2. The bistable circuit M1 is responsive to the output of the amplifier A1 and functions through a direct current amplifier A2 to operate a relay R1 which, in turn, controls the operation of the supply apparatus 11 in certain respects. Thus, when the patient temperature is higher than the normal temperature, relay R1 is energized to close contacts 21 and start the compressor 17. When the patient temperature is lower than the normal temperature, relay R1 is deenergized to close contacts 22 to stop the compressor, and activate the energizing circuit of the heater 18.

The bistable circuit M2 combines the output of the amplifier A1 and the measure of liquid medium temperature provided by thermistor T$h$2 and functions through an amplifier A3 to control the operation of a relay R2. Relay R2 has normally open contacts 23 and 24 which are connected in the energizing circuits of the by-pass valve 17 and the heater 18 respectively.

Thus, when the patient temperature is higher than the normal temperature, relay R1 is energized to run the compressor 17. Relay R2 is energized to close the by-pass valve and pass the liquid medium through the heat exchanger 25 to cool the liquid if the liquid temperature is greater than the normal temperature, and is deenergized to open the by-pass valve and permit the liquid medium to circulate through the leads and pad if the liquid temperature is less than the normal temperature. Again, when the patient temperature is below normal, relay R1 is deenergized to activate the heater circuit. Relay R2 is energized to complete the heater circuit and heat the liquid medium of the liquid temperature is less than the normal temperature, and is deenergized to open the heater circuit if the liquid temperature is greater than the normal temperature. In either circumstance the tempertaure of the liquid medium is brought to a temperature which is above or below the normal temperature by an amount proportional to the difference in temperature between the normal temperature and the patient's temperature below or above the normal temperature, so that the patient is heated or cooled until the normal temperature is reached. For convenience of description the term "proportional temperature" will be used herein, the opposition in temperature difference and factor of proportionality being assumed in the term.

The relay R1 includes contacts 26 which are connected across a series resistor in the circuit from the amplifier A1 to the bistable circuit M1. The resistor and relay have the effect of shifting the operating point of M1 such that the valve and heater are not actuated or deactuated through a predetermined range above or below the normal temperature. Thus the compressor is not turned on until the patient is warmer than the normal temperature by a fixed amount, say .2° C., and the heater is not turned on until the patient is colder than the normal temperature by .2° C.

Figure 2:
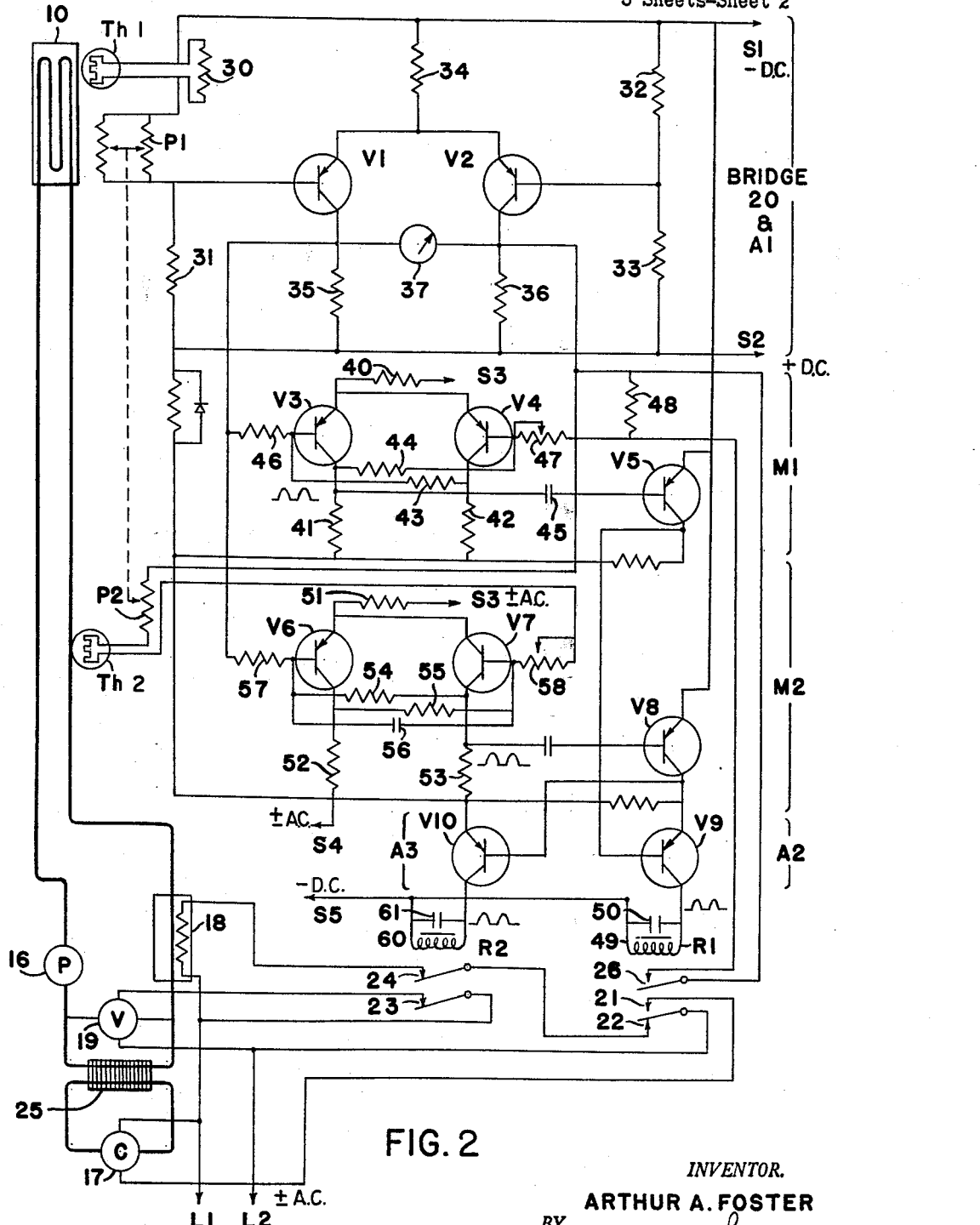
FIG. 2 is a detailed schematic diagram of the apparatus of the invention.

Referring now to FIG. 2, the apparatus of this invention is represented in schematic diagram. The functional relation of the different elements and stages of the apparatus will be referred to FIG. 1.

The bridge 20 is constituted by the body thermistor T$h$1, a shunt resistor 30, potentiometer P1 and three resistors 31, 32 and 33. The connections of the thermistor T$h$1 and the resistor 30 to the resistor 32 and the resistor 31 to the resistor 33 are connected to a direct current supply by leads designated as S1 and S2 respectively. The output terminals of the bridge at the connections of the potentiometer P1 to the resistor 31 and the resistor 32 to resistor 33 are connected to the bases of two p-n-p transistors V1 and V2 which constitute the amplifier A1.

The thermistor T$h$1 is a device know in the art in which a resistance element has a resistance which varies as a function of the temperature of the thermistor. Since, in utilizing the apparatus of the invention, the thermistor T$h$1 is placed in suitable heat transfer contact with the body of the patient, the variation in the resistance of the thermistor provides a measure of the temperature of the patient's body. The potentiometer P1 is utilized to determine a balance point of the bridge for a predetermined temperature of the patient, referred to above as the normal temperature. Thus P1 would be adjusted so that the bridge is in balance and the output zero for the thermistor resistance at the normal temperature taken for example as 98 degrees.

The transistors V1 and V2 are connected in a common emitter balanced amplifier circuit with a common emitter resistor 34 and two load resistors 35 and 36 connected in the respective collector circuits. A galvanometer 37 is connected between the collectors of transistors V1 and V2 to provide an indication of the condition of the bridge e.g. balance or unbalance and the direction of balance or unbalance.

The output of the amplifier A1 is taken from the collectors of the transistors V1 and V2 and fed to the bases of two transistors V3 and V4, respectively, which are connected in a bistable circuit referred to in FIG. 1 as M1. The bistable circuit functions as a flip-flop in which the emitter-collector current supply is varied between zero and full voltage at a periodic rate to null the circuit during the intervals when the voltage is zero. The condition of the two transistors V3 and V4 e.g. as conducting or non-conducting (one of the transistors is conducting and the other non-conducting at any time the circuit is energized as in conventional bistable circuit arrangements) is determined by the bias applied to the emitters at the time the emitter-collector voltage is re-applied. Thus the bistable circuit M1 has an output or a complementary output corresponding to the output of the amplifier A1.

Specifically, V3 and V4 are connected in a nulling bistable circuit M1 having a common emitter resistor 40, load resistors 41 and 42 connected in the collector circuits, the base of V3 coupled to the collector of V4 by resistor 43, and the base of V4 coupled to the collector of V3 by resistor 44. The emitter-collector circuit is connected to an alternating current supply through the leads S3—S4 through the common emitter resistor 40, and through the load resistors 41 and 42 in the collector circuits. Because of the self rectifying character of the circuit, output voltages appear at the collectors of V3 and V4 only during the positive half cycles of the supply voltage. Accordingly, since the output of M1 is taken from the collector of transistor 43, in one of the two stable states the output of M1 comprises discrete pulses of positive half-waves of voltage and in the other of the two stable states the output is essentially zero. The complementary output voltage appears at the collector of the transistor V4 and the output connection to transistor V3 is important only with reference to the output connection of the bistable circuit M2.

The state of the bistable circuit M1, and accordingly the existence or non-existence of the voltage pulses at the output of M1 is determined by the bias voltages applied to the bases of the transistors V3 and V4 by the amplifier A1. As shown, the base of V3 is connected to the collector of V1 through a dropping resistor 46 so that the output of A1 is applied directly to V3 as one stage of the circuit M1. The base of V4 is connected to the collector of V2 through a potentiometer 47, which provides a balancing adjustment for the circuit M1, and a hysteresis or lag resistor 48. The adjustment and connection of the circuit M1 is such that the output of A1, for patient temperatures higher than the normal temperature biases V3 into a conducting state V4 into a non-conducting state to generate output pulses, and for patient temperatures lower than the normal temperature, biases V3 into a non-conducting state and V4 into a conducting state so that no output pulses are generated.

The output of the circuit M1 is applied through a capacitor 45 to a transistor V5 which with transistor V9 functions as the amplifier A2. V5 is connected as a buffer amplifier to isolate the stages and V9 functions as a power amplifier to operate the relay R1. The output of V9 is applied to the coil 49 of the relay R1 which is connected to the negative lead S5 of a direct current supply which has the positive lead common with S2. The capacitor 50 connected across the coil 49 of the relay R1 smooths the operation of the relay.

V5 functions as a phase inverter so that the pulses which appear in the output circuit of V9 are in phase with the pulses at the output of circuit M1. Accordingly, patient temperatures higher than the normal temperature result in positive output pulses and actuation of relay R1 to start the compressor. Patient temperatures lower than the normal temperature produce no output pulses and result in deactuation of relay R1 to activate the heater circuit.

The output of the amplifier A1 is applied to the bases of two transistors V6 and V7 which are arranged in a bistable circuit designated in FIG. 1 as the circuit M2. The circuit M2 functions in the same manner as the circuit M1 with the emitter-collector circuit of the transistors V6 and V7 connected to the alternating current supply through the leads S3—S4, through a common emitter resistor 51, and through the load resistors 52 and 53 in the collector circuits. The base of V6 is coupled to the collector of V7 by means of a resistor 54; the base of V7 is coupled to the collector of V6 by means of a resistor 55; and the bases of V6 and V7 are coupled by a capacitor 56. The capacitor 56 limits the transition rate between states, and hence controls the response to thermal transients in the system.

The output of amplifier A1 functions to bias the two stages of the circuit M2 to determine the existence of nonexistence of output pulses as in the circuit M1. As shown, the output of A1 is applied from the collector of V1 through a dropping resistor 57 directly to the base of V6 as one stage of the circuit. The output of A1 is applied, from the collector of V2 through a potentiometer P2, thermistor $Th2$, and potentiometer 58, to the base of V7 as the remaining stage of the circuit. Accordingly, the effective bias upon the transistors V6 and V7 is determined by the resistances of P2, $Th2$, and 58, which determine the state of the circuit M1 at any given time. The potentiometer 58 functions as a balancing adjustment for the circuit M2 whereas the potentiometer P2, which is mechanically ganged with the potentiometer P1, provides a normalizing adjustment at hereinafter described.

The thermistor $Th2$ is placed in suitable heat transfer relation to the liquid heat exchange medium, as heretofore described, and the resistance of the thermistor element provides a measure of the temperature of the circulating medium. The connection and adjustment of the circuit M2 is such that the output of A1 as modified by thermistor $Th2$ for liquid medium temperatures higher than the required temperature (as hereinafter set forth) biases V6 into a conducting state and V7 into a non-conducting state so that there are no output pulses and, for liquid medium temperatures lower than the required temperature, biases V6 into a non-conducting state and V7 into a conducting state to produce output pulses of positive half waves of voltage.

The output of the circuit M2 is applied through a capacitor 59 to a transistor V8 which, with transistor V10, functions as amplifier A3. V8 is connected as a buffer amplifier to isolate the stages and V10 functions as a power amplifier to operate the relay R2. The output of V10 is applied to the coil 60 of the relay R2 which is connected to the negative supply lead S5. A capacitor 61 connected across the coil 60 of the relay R1 smooths the operation of the relay.

V8 functions as a phase inverter so that the pulses which appear in the output circuit of V10 are in phase with the pulses at the output of the circuit M2. Accordingly, liquid medium temperatures higher than the required temperature results in no output pulses from A3 and deactuation of relay R2 to close the by-pass valve and open the heater circuit; liquid medium temperatures lower than the required temperature result in positive output pulses from A3 and actuation of relay R2 to open the by-pass valve and to close the heater circuit.

The circuit, which includes the hysteresis or log resistor 48 in series between the output of the collector of V2 and the base of V4 and the contacts 26 of relay R1, functions to shift the operating point of the circuit M1 so that the starting and stopping of the compressor 17 takes place only for temperature changes greater than some arbitrary range of temperatures above and below the predetermined or normal temperature. Thus, the contacts 26 are normally open so that the resistor 48 is in the circuit and the bias on the base of V4 has a magnitude such that the relay R1 is not actuated and the heater 18 is not turned on until the patient is .2° C. below the normal temperature. Conversely, with the relay actuated and the resistor 48 shorted, the compressor is not turned on until the patient is .2° C. above the normal temperature. This arrangement achieves two desirable results; first, the continual starting and stopping of the compressor which would otherwise result from the usual small fluctuations in the temperature of the patient is prevented; and, second, the provision of a range of temperatures in which the apparatus does not function permits the patient to maintain his body temperature by natural processes as he is able.

The functioning of the various elements and stages of the apparatus will be further understood by reference to FIG. 3 wherein the time variation of temperature of the patient and of the pad are shown for circumstances in which the initial temperature of the patient and of the pad are greater than the normal temperature T. In the showing of FIG. 3 the time of operation of the relays R1 and R2 characterizes the operation of the heating and cooling devices of the apparatus. The temperature of the liquid medium is taken as equal to that of the pad and the patient temperature $Tp$ and pad temperature $Tf$ are assumed as constant for an initial interval during which the entire apparatus is inoperative.

The apparatus is started at the time $t_0$, at which time the pump 16 is started and at which time the control circuits 14 are assumed to be operative. Inasmuch as the patient temperature $Tp$ is higher than the normal temperature T, the output of the bridge 20, the circuit M1, and the amplifier A2, is such that the relay R1 is energized and the compressor 17 is running. Again the pad temperature $Tf$ is such that output of the amplifier A1 is modified by the thermistor $Th2$ so that the relay R2 is deenergized by the circuit M2 and the amplifier A3. Accordingly, contacts 23 are open, the by-pass valve 17 is closed and the cooling apparatus cools the liquid medium to reduce the temperature of the pad 10. As heat energy is transferred from the patient to the liquid medium the temperature of the patient drops, at first slowly, and then more rapidly as the temperature difference between patient and the pad increases. This process continues until, at the time $t_1$ the temperature of the liquid medium and the pad reach a temperature which is below the normal temperature T by a proportional factor of the temperature of the patient above the normal temperature T, that is, until the proportional temperature is reached. At time $t_1$, R2 is energized, valve 19 is opened to shunt the refrigerating apparatus, and the liquid medium is circulated without cooling.

Since the patient is warmer than the pad, the liquid medium receives heat energy from the patient and the temperature of the medium and of the pad drifts slowly upward until the relay R2 is again deenergized, valve 19 is closed and the liquid medium and the pad are cooled until the proportional temperature for the temperature of the patient at time $t_2$ is reached. Thereupon the relay R2 is again energized and the entire process is repeated.

It is important that, because of the characteristics of the null flip flop circuits, only slight variations of the pad temperature above the proportional temperature and back to the proportional temperature are required to energize and deenergize the relay R2. Accordingly, the operation of the apparatus is fixed for a normal temperature T and the patient and pad are brought to the normal temperature without hunting or other undesirable variations of system and/or patient temperature.

In FIG. 3 the curve of pad temperature is shown illustratively for a proportional temperature in which the proportionality factor is unity. That is, the difference between the normal temperature T and the proportional temperature is equal in absolute magnitude to the difference between the patient temperature and the normal temperature at each instant of time following time $t_1$. In the actual apparatus, the proportionality factor utilized is dependent primarily upon the thermal capacity of the apparatus system including the pad 10, the supply apparatus 11, and the leads 12 and 13 and the thermal capacity of the body of the patient. In apparatus such as that described herein, the proportionality factor may be in the order of 25 to 35 to 1.

The operation of the control circuits and supply apparatus may be summarized as follows:

(1) For body temperatures Tp higher than the normal temperature T the output of the bistable circuit M1 and the amplifier A2 consists of positive impulses which actuate the relay R1 to start the compressor 17. Further operation depends upon the relation of the pad temperature to the proportional temperature:

For pad temperatures Tf greater than the proportional temperature the output of the circuit M1 and the amplifier A3 is zero so that the relay R2 is deactuated. Accordingly, the circuit to the by-pass valve 19 is deenergized, the valve 19 is closed and the liquid medium is circulated through the heat exchanger 25 to cool the liquid and reduce the temperature of the pad 10 to the proportional temperature. Thereupon, the relay R2 is actuated and the liquid medium is circulated without cooling until the temperature drifts upward to deactuate the relay R2.

For pad temperatures Tf less than the proportional temperature the output of the circuit M2 and of the amplifier A3 consists of positive pulses so that the relay R2 is actuated and the circuit to the by-pass valve 19 is deenergized. Accordingly the valve 19 is open and the liquid medium is circulated through the system until the transfer of heat energy to the circulating liquid increases the temperature of the liquid above the proportional temperature to cause the relay R2 to be deactuated.

(2) For body temperature Tp lower than the normal temperature T, the output of the circuit M1 and the amplifier A2 is zero so that the relay R1 is deactuated, the compressor 17 is stopped, and the energizing circuit to the heater 18 activated. Again further operation depends upon the relation of the pad temperature to the proportional temperature:

For pad temperatures Tf less than the proportional temperature the output of the circuit M2 and the amplifier A3 consists of positive pulses so that the relay R2 is actuated and the circuit to the heater 18 is closed. Accordingly, the heater is energized and the liquid medium is heated until the proportional temperature above the normal temperature is reached. Thereupon the relay R2 is deactuated and the liquid medium is circulated without heating until the relay R2 is again actuated.

For pad temperatures Tf greater than the proportional temperature the output of the circuit M2 and of the amplifier A3 is zero so that the relay R2 is deactuated. Accordingly, the circuit to the heater 18 is open and remains open until the transfer of heat energy from the circulating liquid reduces the temperature of the liquid below the proportional temperature to actuate the relay R2.

In each of the circumstances of paragraphs (1) and (2) above, the operation continues until the patient and the liquid reach the normal temperature, whereupon the output of the bridge 20 is reduced to zero, and relays R1 and R2 are deactuated. The circulation of the liquid continues but no heating or cooling takes places until the temperature limits above or below the normal temperature are exceeded.

Because of the system proportionality above referred to, and because the change in the output of the bridge 20 and of the amplifier A1 is dependent only on the change in temperature of the patient, the control circuit includes provisions for shifting the operating point of the circuit M2 when the balance point of the bridge 20 is modified by adjustment of the potentiometer P1. Thus a potentiometer P2 is connected in series with the thermistor Th2 and is mechanically ganged with the potentiometer P1 so that the bias voltage applied to the base of the transistor V7 is changed in magnitude when the potentiometer P1 is adjusted to change the normal temperature at which the patient is maintained.

The potentiometer is so designed with respect to the remaining apparatus that when the normal temperature is shifted the magnitude of the bias applied to the base of the transistor V7 is modified so that the liquid medium is cooled whenever the patient temperature is above the normal temperature and the pad temperature is above the proportional temperature below the normal temperature and so that the liquid medium is heated whenever the patient temperature is below the normal temperature and the pad temperature is below the proportional temperature above the normal temperature.

Thus, for example, in the absence of the potentiometer P2 and with a system design for maintaining the patient at a normal temperature 37° C. the operation of circuit M2 and the relay R2 would always bring the pad temperature toward 37° C. inasmuch as the modification of the bias voltage applied to the transistor V7 by reason of the change in the resistance of the thermistor Th2 would always have the same effect upon the operation of the circuit M2 and of the relay R2. However, if the potentiometer P1 were adjusted, for example, to maintain a patient in hypothermia at 10° C., the resistance of the thermistor Th2 would determine an operation of the circuit M2 such that the by-pass valve 19 would not be closed to cool the liquid medium until the patient temperature had reached a point sufficiently above the 10° C. temperature to require cooling if the potentiometer were set at the 37° C. temperature. Thus for a range of temperatures above the normal temperature of 10° the circuit M2 would function as though the liquid medium were cooler than the proportional temperature below 10° C. and cause the valve 19 to be held open. By the inclusion of the potentiometer P2 the operating point of the circuit M2 is made to correspond to the actual normal temperature as determined by the potentiometer P1 rather than the apparent normal determined by the system characteristics.

The bistable circuits M1 and M2 are illustrated in FIG. 4 as embodied in a typical null flip-flop with associated circuitry. The apparatus shown in FIG. 4 comprises a flip-flop circuit 70, a power supply 71 recurrently energizing the flip-flop 70, and input or drive circuit 72 connected to the input of the flip-flop 70, and an output circuit or utilization circuit 73 connected to the output of the flip-flop 70.

The flip flop 70 is constituted by two transistors V11 and V12 having emitters 74 and 75 connected to a common emitter resistor 76 and the collectors 77 and 78 connected to separate load resistors 79 and 80. The bases 81 and 82 of the transistors V11 and V12 are coupled each to the collector of the remaining transistors 78 and 77 respectively by means of coupling resistors 83 and 84 and the bases are biased with respect to the emitters by bias supplies 85 and 86 connected through isolation resistors 87 and 88 respectively.

As in conventional flip flop circuits the circuit 70 functions so that the transistor V11 is conducting when the transistor V12 is nonconducting and the transistor V11 is non-conducting when the transistor V12 is conducting and the circuit remains stably in either state unless subjected to driving signals from the input circuit 72. The driving signals modify the conducting states of the two transistors by change in the bias voltage applied to the base 81 in one direction, or by the complementary or mutually exclusive change in bias voltage applied to the base 82 in the opposite direction. The output signal applied to the output circuit 73, derived from the collector 78 of the transistor V12, corresponds to the change in current through the load resistor 80 as the transistor V12 changes state. A complementary or mutually exclusive output may, of course, be derived from the circuit of the collector 77 of transistor V11.

Whereas in conventional flip flop circuitry the emitter-collector circuits of the transistor V11 and V12 are energized by direct voltages, the power supply 71 is constituted by an alternating current transformer 90 for applying alternating voltage to those circuits. Due to the uni-directional conduction of the transistors V11 and V12 the flip flop 70 has a self rectifying character so that emitter-collector circuits are intermittently energized by half waves of voltage.

Accordingly, the output signal applied to the output circuit 73 during the times when the transistor V12 is conducting comprises half waves of current with a quiescent or null interval between the half waves.

The result achieved by the arrangement just described is of importance particularly where the signal from the input circuit 72 is a continuously varying voltage or other function. The recurrent deenergization and reenergization of the emitter-collector circuits of the flip flop results in a sampling process in which the input to the flip flop is compared with the reference condition at the periodic rate of nulling so that the flip flop is caused to assume one of the two stable states corresponding to the input upon each reenergization of the emitter-collector circuit.

Accordingly, the output of the flip flop follows the input to a high degree of accuracy determined only by the periodic rate of nulling with respect to the rate of variation in the input.

It will be recognized that the nulling operation has another important aspect with respect to the operation of the flip-flop 70. This is due to the fact that the class of bistable devices of which the flip flop 70 is an example displays a tendency to return to the previous state. That is, for any given state the device does not cease to operate at the same bias level as that at which it started. Stated in another way the signal required to cause the change from one state to another state is much larger than the signal required to change the circuit from a neutral state to one or the other of those states.

In the null flip flop, and nulling bistable devices generally as herein described, the circuit is brought to a neutral condition for a time interval sufficient to permit the residual voltages and/or currents relevant to the prior state or condition to dissipate. Thereafter, the circuit may move into either of the stable states as a result of a small input of either polarity without bias against the change in the one direction because of the former condition.

Thus, in the circuit of FIG. 2 the input applied to the bistable circuit M1 is constituted by the change in bias voltages applied to the bases of the transistors V3 and V4 from the load resistors 35 and 36 of the amplifier A1, due to the change in the condition of the bridge 20 with variation in the resistance of the thermistor Th1. The reference condition is the balance of the bridge 20 and the circuit M1 is stable in either of two conditions according as the bridge is unbalanced in one direction corresponding to a body temperature above normal, in which case an output signal appears across the load resistor 41 due to conduction of the transistor V3, or unbalance of the bridge 20 in the opposite direction corresponding to a body temperature below normal, in which case the transistor V3 is non-conducting and no output appears across the load resistor 41. Since the circuit M1 is energized by 60 cycle alternating voltage the redetermination or comparison of the patient temperature with the normal is accomplished 60 times per second.

The bistable circuits M1 and M2 embody the null flip flop of FIG. 4 in one specific form only and other forms of the apparatus may be achieved by various combinations of means for accomplishing the nulling function, the input circuit, and the means for determining the reference condition. Thus, as shown in FIG. 5, the power supply 91 may be constituted by a direct voltage supply 92 with a chopper 93 or other means for periodically interrupting the connection between the supply and the flip flop. Alternately, a direct voltage supply may be used with a blanking pulse having a repetition rate equal to the desired nulling rate applied across the common emitter resistor 76.

In FIG. 4 a balanced input circuit configuration between the input circuit 72 and the bases 81 and 82 of the transistors V11 and V12 is provided by the circuits 94 and 95. It will be recognized that either of the circuits 94 or 95 might be utilized with appropriate input signals since the bias supplies 85 and 86 determine fixed bias voltages which constitute the reference condition. Moreover, the input might be provided by a potentiometer or variable reactance in the input circuit 72 in which the change of impedance acts, in effect, as the change in a variable signal at the input of the flip flop 70.

It will be recognized that the invention may be embodied in forms equivalent to that described herein by substituting electron tubes for transistors, normally open relays and valves for normally closed relays and valves, and the like.

The foregoing description is not intended to restrict the scope of the invention and various rearrangements of the parts and modifications of design may be resorted to. The following claims are directed to combinations of elements which embody the invention or inventions of this application.

What is claimed is:

1. In therapeutic apparatus for maintaining the temperature of a patient within a predetermined range of temperature and in which there is provided a pad for contacting the patient's body, means for circulating a heat exchange fluid through the pad, a heater for supplying thermal energy to the fluid and an electrical circuit for energizing the heater, and a cooler for removing thermal energy from the fluid and an electrical circuit for controlling the cooler, that combination which comprises a first means for sensing the temperature of the patient, a second means for sensing the temperature of the fluid, electrical bridge means having the said first sensing means connected as one arm thereof and balanced at a desired normal temperature of the patient, means responsive to the output of the said bridge for selectively activating the cooler means when the patient temperature is higher than the normal temperature and for activating the heater circuit when the patient temperature is lower than the normal temperature, and means responsive to the output of said bridge and to the said second sensing means for selectively energizing the said heater circuit to heat the fluid when the fluid temperature is less than a temperature above the normal temperature by a factor proportional to the patient temperature below the normal temperature and for operating the cooler means to cool the fluid when the fluid temperature is greater than a temperature below the normal temperature by a factor proportional to the patient temperature above the normal temperature.

2. The invention in accordance with claim 1 in which the means responsive to the output of the bridge comprises, in each instance, a bistable circuit for producing one output for unbalance of the bridge in one polarity and another output in response to unbalance of the bridge in the oposite polarity and two position relay means responsive to the outputs of the said bistable circuit.

3. A therapeutic apparatus for control of the body temperature of a patient comprising a pad having a conduit therein, fluid circuit means comprising means for circulating a liquid heat exchange medium through the conduit, a cooler including a compressor, and an electrically operated by-pass valve for the cooler, an electric heater in the said fluid circuit and an electric circuit therefor, a first thermistor adapted to sense the body temperature, a direct current bridge adapted to be balanced at a normal temperature and having the first thermistor connected in one arm thereof, a first circuit means responsive to the output of the said bridge for producing a first output when the bridge becomes unbalanced in one polarity due to body temperature above the normal temperature, and a second output when the bridge becomes unbalanced in the remaining polarity due to body temperature below the normal temperature, a first relay means responsive to the output of the said first circuit means and connected to the said compressor and to the said heater circuit for starting the compressor and opening the heater circuit in response to the first output and for stopping the compressor and closing the heater circuit in response to the second output, a second circuit means responsive to the output of said bridge for producing a first output when the bridge becomes unbalanced in the said remaining polarity and a second output when the bridge becomes unbalanced in the said one polarity, a second relay means responsive to the output of the said second circuit means and connected to the by-pass valve and to the heater circuit, and a second thermistor in the said fluid circuit means connected between the bridge and the said second circuit means for controlling the operation of the second circuit means in accordance with the temperature of the liquid medium to open the by-pass valve and close the heater circuit to heat the liquid medium when the temperature of the liquid medium is less than a temperature above the normal temperature that is a function of the difference between the normal temperature and the body temperature below the normal temperature and for closing the by-pass valve and opening the heater circuit to cool the liquid medium when the temperature of the liquid medium is higher than a temperature below the normal temperature that is a function of the difference between the normal temperature and the body temperature above the normal temperature.

4. A therapeutic apparatus for control of the body temperature of a patient comprising a pad having a conduit therein, fluid circuit means comprising means for circulating a liquid heat exchange medium through the conduit, a cooler including a compressor, and an electrically operated by-pass valve for the cooler, an electric heater in the said fluid circuit and an electric circuit therefor, a first thermistor adapted to sense the body temperature, a direct current bridge adapted to be balanced at a normal temperature and having the first thermistor connected in one arm thereof, a first circuit means responsive to the output of the said bridge comprising a first null flip flop for producing output voltages when the bridge becomes unbalanced in one polarity due to body temperature above the normal temperature and no output voltage when the bridge becomes unbalanced in the remaining polarity due to body temperature of the patient below the normal temperature, a first relay means responsive to the output of the said first flip flop and connected to the said compressor and to the heater circuit for starting the compressor and opening the heater circuit in response to output voltages from the said first flip flop and for stopping the compressor and closing the heater circuit in the absence of output voltages from the said first flip flop, a second circuit means responsive to the output of the said bridge comprising a second null flip flop for producing output voltages when the bridge becomes unbalanced in the said remaining polarity and no output voltages when the bridge becomes unbalanced in the said one polarity, a second relay means responsive to the output of the said second flip flop and connected to the by-pass valve and to the heater circuit, and a second thermistor in the said fluid circuit means connected between the bridge and the said second flip flop for controlling the operation of the flip flop in accordance with the temperature of the liquid medium to open the by-pass valve and close the heater circuit to heat the liquid medium when the temperature of the liquid medium is less than a temperature above the normal temperature that is a proportional factor of the difference between the normal temperature and the body temperature below the normal temperature and for closing the by-pass valve and opening the heater circuit to cool the liquid medium when the temperature of the liquid medium is higher than a temperature below the normal temperature that is a proportional factor of the difference between the normal temperature and the body temperature above the normal temperature.

5. The invention in accordance with claim 4 in which the said circuit means include a balanced direct current amplifier having the input therof connected to the said bridge and the output thereof applied to the said flip flops as bias voltages for determining the operation of the flip flops and in which the said second thermistor modifies the bias voltage applied to the said second flip flop.

6. The invention in accordance with claim 5 in which a resistor is connected in series between the said amplifier and the said first flip flop, and in which the said first relay means has contacts in shunt with the said resistor for shorting the resistor whereby the bias applied to the said first flip flop is modified to prevent operation of the said first relay means through a predetermined range of temperatures about the normal temperature.

7. The invention is accordance with claim 4 with manual means for setting the normal temperature comprising a potentiometer connected in the said bridge for adjusting the balance point of the bridge.

8 The invention in accordance with claim 4 with means including a potentiometer connected in series with the said second thermistor for modifying the operation of the said second flip flop to maintain the factor of proportionality of heating or cooling for different normal temperatures.

9. The invention in accordance with claim 8 with a potentiometer connected in the said bridge for setting the normal temperature mechanically ganged with the said named potentiometer for simultaneous manual adjustment thereof.

10. The invention in accordance with claim 5 with a first potentiometer connected in the bridge for setting the normal temperature, a second poteniometer connected in series between the said amplifier and the said second flip flop, and a mechanical connection betwen the two said potentiometers for simultaneous manual adjustment thereof.

11. Apparatus for temperature control in a system in which a body is heated and cooled by a fluid heat exchange medium, fluid circuit means including means for circulating the medium, cooler means, and heater means, electric circuits for operating the cooler means and electric circuits for operating the heater means, comprising, a first temperature sensing means for sensing the body temperature, bridge means adpated to be balanced at a normal temperature having the said first temperature sensing means connected therein, a first circuit means responsive to the output of the bridge means for producing one output when the bridge means becomes unbalanced in one polarity due to body temperature above the normal temperature and another output when the bridge becomes unbalanced in the remaining polarity due to body temperature below the normal temperature, a first relay means responsive to the output of the said first circuit means and connected to the said cooler electric circuit and to the said heater electric circuit for activating the cooler circuits and deactivating the heater circuits in response to the first output and for deactivating the cooler circuits and activating the heater circuits in response to the second output, a second circuit means responsive to the output of the said bridge for producing a first output when the bridge becomes unbalanced in the said remaining polarity and a second output when the bridge becomes unbalanced in the said one polarity, a second relay means responsive to the output of the said second circuit means and connected to the cooler electric circuit and to the heater electric circuit, and a second temperature sensing means in the said fluid circuit means connected in said second circuit means for controlling the operation of the second circuit means in accordance with the temperature of the liquid medium to stop the cooler means and start the heater means to heat the liquid medium when the temperature of the liquid medium is less than a temperature above the normal temperature that is a function of the difference between the normal temperature and the body temperature below the normal temperature and for starting the cooler means and stopping the heater means to cool the liquid medium when the temperature of the liquid medium is higher than a temperature below the normal temperature that is a function of the difference between the normal temperature and the body temperature above the normal temperature.

12. The invention in accordance with claim 11 in which the cooler means comprises a compressor, a heat exchanger, a by-pass valve connected across the heat exchanger for directing the medium either through or past the heat exchanger, the first relay means starts and stops the compressor, and the second relay means closes and opens the by-pass valve.

13. The invention is accordance with claim 11 with adjustable means in the bridge for manually setting the normal temperature.

14. The invention in accordance with claim 11 with adjustable means connected in the said second circuit means for varying the response to the bridge to control the difference function of temperature.

15. The invention in accordance with claim 11 in which the said first and second circuit means are first and second bistable circuits and the said relay means are two-position relays.

16. The invention in accordance with claim 15 in which the bistable devices are null flip flops, and the circuit means include means for varying bias voltages of the flip flops for determining the state thereof.

References Cited in the file of this patent

UNITED STATES PATENTS

| | | |
|---|---|---|
| 1,896,953 | Hassell | Feb. 7, 1933 |
| 1,914,026 | Kirk | June 13, 1933 |
| 2,217,797 | Donovan | Oct. 15, 1940 |
| 2,290,091 | Brown | July 14, 1942 |
| 2,490,932 | Thuney | Dec. 13, 1949 |
| 2,603,422 | Sargeaunt | July 15, 1952 |
| 2,753,435 | Jepson | July 3, 1956 |
| 2,866,072 | Smith | Dec. 23, 1958 |
| 2,920,215 | Lo | Jan. 15, 1960 |
| 2,985,774 | Carbone | May 23, 1961 |

UNITED STATES PATENT OFFICE

CERTIFICATE OF CORRECTION

Patent No. 3,074,410  January 22, 1963

Arthur A. Foster

It is hereby certified that error appears in the above numbered patent requiring correction and that the said Letters Patent should read as corrected below.

Column 3, line 33, for "of" read -- if --; column 5, line 35 for "of", second occurrence, read -- or --; line 49, for "at" read -- as --; column 6, line 9, for "log" read -- lag --; column 8, line 70, for "constiuted" read -- constituted --; column 9, line 9, for "unles" read -- unless --; line 26, for "voltage" read -- voltages --; column 12, line 13, after "the", second occurrence, insert -- second --; line 29, for "therof" read -- thereof --; same column 12, line 61, for "betwen" read -- between --; column 14, line 6, for "is" read -- in --.

Signed and sealed this 31st day of December 1963.

(SEAL)
Attest:

ERNEST W. SWIDER
Attesting Officer

EDWIN L. REYNOLDS
Acting Commissioner of Patents